United States Patent [19]

Nakamura et al.

[11] Patent Number: 5,218,393
[45] Date of Patent: Jun. 8, 1993

[54] VIEWFINDER WITH FIELD OF VIEW INDICATING FRAME

[75] Inventors: Susao Nakamura; Tahei Morisawa, both of Tokyo, Japan

[73] Assignee: Asahi Kogaku Kogyo Kabushiki Kaisha, Tokyo, Japan

[21] Appl. No.: 679,270

[22] Filed: Apr. 2, 1991

[30] Foreign Application Priority Data

Apr. 12, 1990 [JP] Japan .................................. 2-38140
Apr. 26, 1990 [JP] Japan ................................. 2-110764

[51] Int. Cl.$^5$ ............................................. G03B 13/04
[52] U.S. Cl. ..................................................... 354/219
[58] Field of Search ................ 354/219, 220, 221, 222, 354/223, 224, 225

[56] References Cited

U.S. PATENT DOCUMENTS

| 4,003,637 | 1/1977 | Masuoka | 354/419 |
| 4,545,655 | 10/1985 | Fantone et al. | 354/419 |
| 4,557,578 | 12/1985 | Seely | 354/225 |
| 4,650,293 | 3/1987 | Kimura et al. | 350/453 |
| 4,707,098 | 11/1987 | Wakamiya | 354/219 |
| 4,891,658 | 1/1990 | Goddard | 354/419 |
| 4,893,141 | 1/1990 | Smart | 354/419 |
| 4,967,219 | 10/1990 | Morisawa et al. | 354/219 |

FOREIGN PATENT DOCUMENTS

| 2938449 | 4/1980 | Fed. Rep. of Germany . |
| 2544091 | 10/1984 | France . |
| 61-97633 | 5/1986 | Japan . |
| 664755 | 1/1952 | United Kingdom . |
| 765061 | 1/1957 | United Kingdom . |
| 876861 | 9/1961 | United Kingdom . |
| 1024315 | 3/1966 | United Kingdom . |
| 1176005 | 1/1970 | United Kingdom . |
| 1588896 | 4/1981 | United Kingdom . |
| 2068584 | 4/1981 | United Kingdom . |
| 2082343 | 3/1982 | United Kingdom . |
| 2241082 | 8/1991 | United Kingdom . |

Primary Examiner—Donald A. Griffin
Assistant Examiner—Cassandra Spyrou
Attorney, Agent, or Firm—Sandler Greenblum & Bernstein

[57] ABSTRACT

A viewfinder includes an objective lens, an eyepiece lens, and an indication frame which can be observed through the eyepiece together with an image of an object formed by the objective lens. An optical member is provided having a light incident surface and a light emergent surface. The indication frame can be located to extend between the incident and emergent surfaces. According to one embodiment of the present invention, the thickness of the optical member is greater than the image forming range of the viewfinder. According to another embodiment of the present invention, the indication frame is contained within a bright frame plate made of plain parallel plates of transparent material.

36 Claims, 4 Drawing Sheets

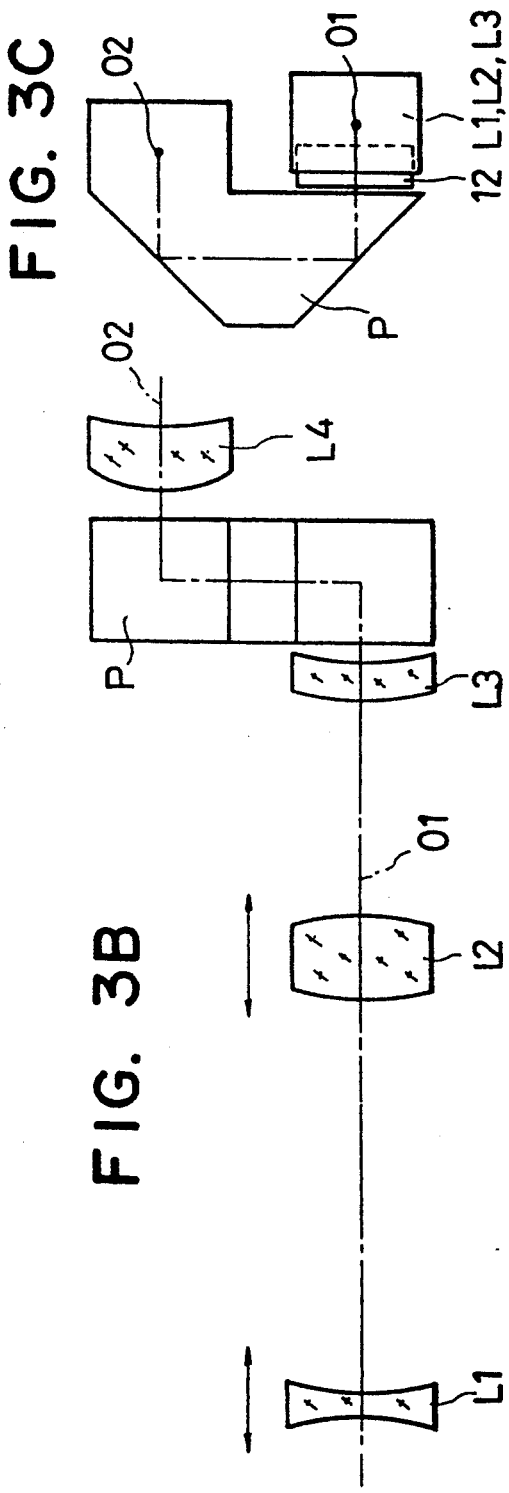
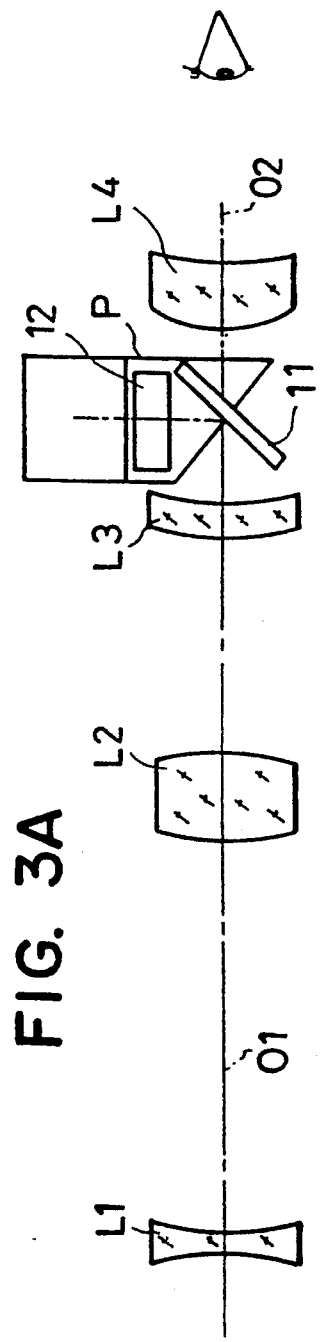

VIEWFINDER WITH FIELD OF VIEW INDICATING FRAME

BACKGROUND OF THE INVENTION

1. Field of the Invention

The present invention relates to a viewfinder which has an indicating frame in a field of view, for example a viewfinder which is provided in a camera, separately from a photographic optical system of the camera.

2. Discussion of the Background Information

One example of a conventional viewfinder has been used is referred to as a real image type finder. In a real image finder an observer observes a real image of an object formed by the objective optical system of the finder through the eyepiece optical system.

In such a real image type viewfinder, generally, either an indicating frame, such as a field frame representing an area to be photographed through a photographing optical system of a camera, or a focusing frame (i.e., an objective distance measuring frame) representing an area for measuring the distance of the object from the camera by an object distance measuring device, is drawn on one surface of an indicating plate (or a finder screen). The indicating frame is disposed at the same position as an image, formed by the optical image system, of an object which is located a predetermined distance away from the camera. The predetermined distance will be referred to as a reference objective distance hereinafter. The indicating screen comprises a plane-parallel transparent plate made of glass, plastic, or similar material, i.e., a substantially flat plate having parallel planar surfaces. Thus, this type of viewfinder is arranged so that an observer is able to observe the image of the indicating frame with substantially the same visibility as the objective image is seen through the eyepiece lens of the viewfinder.

Another example of a conventional viewfinder which is used is an inverted Galilean type Albada finder. The optical system of this type of finder comprises an objective lens, which has a negative refractive power so as to form a virtual image of an object, and an eyepiece lens, which has positive refractive power so as to magnify the virtual image.

In this type of viewfinder, an indicating plate which comprises a plane-parallel transparent plate is disposed between the objective lens and the eyepiece lens. The object side surface of the plate, i.e., the surface of the plate closest to the object, has an indicating frame drawn thereon. This frame is a bright frame formed by vapor deposition of metal. The surface of the objective lens which is adjacent to the eyepiece is formed with a negative curvature and is coated with metal so as to function as half-mirror.

The position of the indicating frame is arranged so that the position of the image, which is formed by a reflection of the indicating frame on the surface of the objective lens, coincides with the position of the virtual image of the object at said reference objective distance, which image is formed by the objective lens.

In such conventional viewfinder optical systems, however, because the indicating frame is drawn on the surface of a plane-parallel transparent plate, and because the surface of the indicating frame plate which is drawn on the indicating frame is exposed to air, it is possible that foreign matter, such as dust, cut chips produced during the manufacturing process of the finder, or drips of water, will stick to the surface of the plate. In this case, the indicating frame and the surface on which the frame is drawn are located at the same optical axial position, so that once even small foreign matter sticks to the surface having the indicating frame thereon, the foreign matter and the indicating frame will be observed in the same condition of visibility through the eyepiece lens Further, foreign matter on the plate is magnified by the eyepiece, even if it is small. Therefore, one problem which arises in these viewfinders is that foreign matter is conspicuously seen in the field of the viewfinder. Further, because it is difficult to remove such foreign matter during camera assembly, to do so would unduly slow the production process and reduce the rate of camera production.

Further, in such conventional viewfinder optical systems, the indicating frame plate is thin and the indicating frame is merely drawn on, or attached to, the object side surface of the plate. However, the imaging position of an image of an object, which is formed by the objective lens, axially varies according to the objective distance of the object, so that when an observer observes the image of the object formed by the objective lens with the eyepiece lens, the observer observes the image by varying the focus of the eye of the observer according to the axial position of the image, which varies as described above. In other words, the observer observes the virtual image which is formed by the eyepiece lens and which is based upon the image of the object which is formed by the objective lens. This circumstance is discussed hereinafter as well. Therefore, when the observed object is at the objective distance where the position of the image of the object formed by the objective lens coincides with the position of the indicating frame or its image, i.e., the reference objective distance, the observer can observe the object and the indicating frame clearly at the same time. However, usually the image of the object formed by the objective lens does not coincide with the position of the indicating frame or its image, and an observer will therefore not be able to observe them clearly at the same time, so that the observer must alternately move and adjust the focus of the eye of the observer for the object image and for the indication frame or the image of the frame. As a result, another problem arises in that the observer will find it difficult to observe both the object image and the indication frame or the frame image, and will accordingly tend to become fatigued.

SUMMARY OF THE INVENTION

The present invention relates to a viewfinder whose objective optical system forms an image, i.e., a real or virtual image, of an object observed through the eyepiece optical system of the viewfinder. One object of the present invention is to provide a viewfinder having a field of view in which no foreign matter can be conspicuously seen, even if foreign matter sticks to the surface of the indicating frame plate of the viewfinder.

Further, another object of the present invention is to provide a viewfinder with which an observer can always clearly observe the indicating frame and the object through the eyepiece of the viewfinder at the same time, even if the objective distance of the object varies.

At least part of the present invention is based upon the recognition that foreign matter sticking to the indicating frame plate is conspicuously seen in the field of view of conventional viewfinders because the optical axial position of the surface to which the foreign matter sticks coincides with the optical axial position of the indicating frame or of the image of the object which the observer gazes at and focuses the observer's eye upon, and because the eye therefore focuses on the foreign matter at the same time as the frame or image. Accordingly, one object of the invention is to establish these positions so that they do not coincide.

In order to achieve these objects, according to the present invention, a viewfinder is provided having an objective lens, an eyepiece lens, and an indicating frame which is observed through said eyepiece lens, together with the image of an object formed by said objective lens, the viewfinder comprising at least one optical component which has an incident surface and an emergent (i.e., emission) surface, and which is provided with said indicating frame at least at a position located between said two surfaces In a viewfinder constructed in this manner, even if foreign matter sticks to the surface of the indicating frame plate, no foreign matter will be conspicuously seen, unlike the case with conventional apparatus as noted above, as long as the observer gazes at the indicating frame, inside of the plate and focuses the eye of the observer on the frame, because the eye of the observer does not focus on the foreign matter, the visibility of which is different from the visibility of said indicating frame.

In addition, if the indicating frame is provided for an indicating frame plate which has a certain thickness, in the axial direction of the viewfinder optical system, and if the frame extends over the entire range of the plate thickness, the observer can clearly observe both the indicating frame and an objective image at the same time, regardless of the location where an image of an object is formed by the objective lens within the range of thickness of said plate.

Further, according to the present invention, a viewfinder is provided having an objective lens, an eyepiece lens, and an indicating plate which is observed through said eyepiece lens together with the image of an object formed by said objective lens, wherein said indicating plate has an incident surface and an emergent surface, said incident surface and said emergent surface being located at positions where the virtual images of the surfaces formed by the eyepiece are out of the image forming range of the virtual image formed by the eyepiece lens, which virtual image is based on the image of the object which is formed by the objective lens, with the position of the image of the object varying depending on the object distance of the object.

In the viewfinder thus constructed, no foreign matter can be conspicuously seen by an observer, whatever the object and distance being viewed are, because the observing eye does not focus on foreign matter, the visibility of which is different from the visibility of the image of the object formed by the objective lens.

Further, according to the present invention, a viewfinder is provided having an objective lens, an eyepiece lens, and an indicating frame which is observed through said eyepiece lens, together with an image of an object formed by said objective lens, wherein said indicating frame can be held or suspended in air.

In the viewfinder thus constructed, no foreign matter can be seen at all, contrary to the case of a conventional viewfinder, because there is no indicating frame surface to which foreign matter should stick.

BRIEF DESCRIPTION OF THE ACCOMPANYING DRAWINGS

The embodiments of the present invention will be described hereinafter with reference to the accompanying drawings, in which like reference numerals are used to describe similar parts throughout the several views thereof, and wherein.

Figure 5:
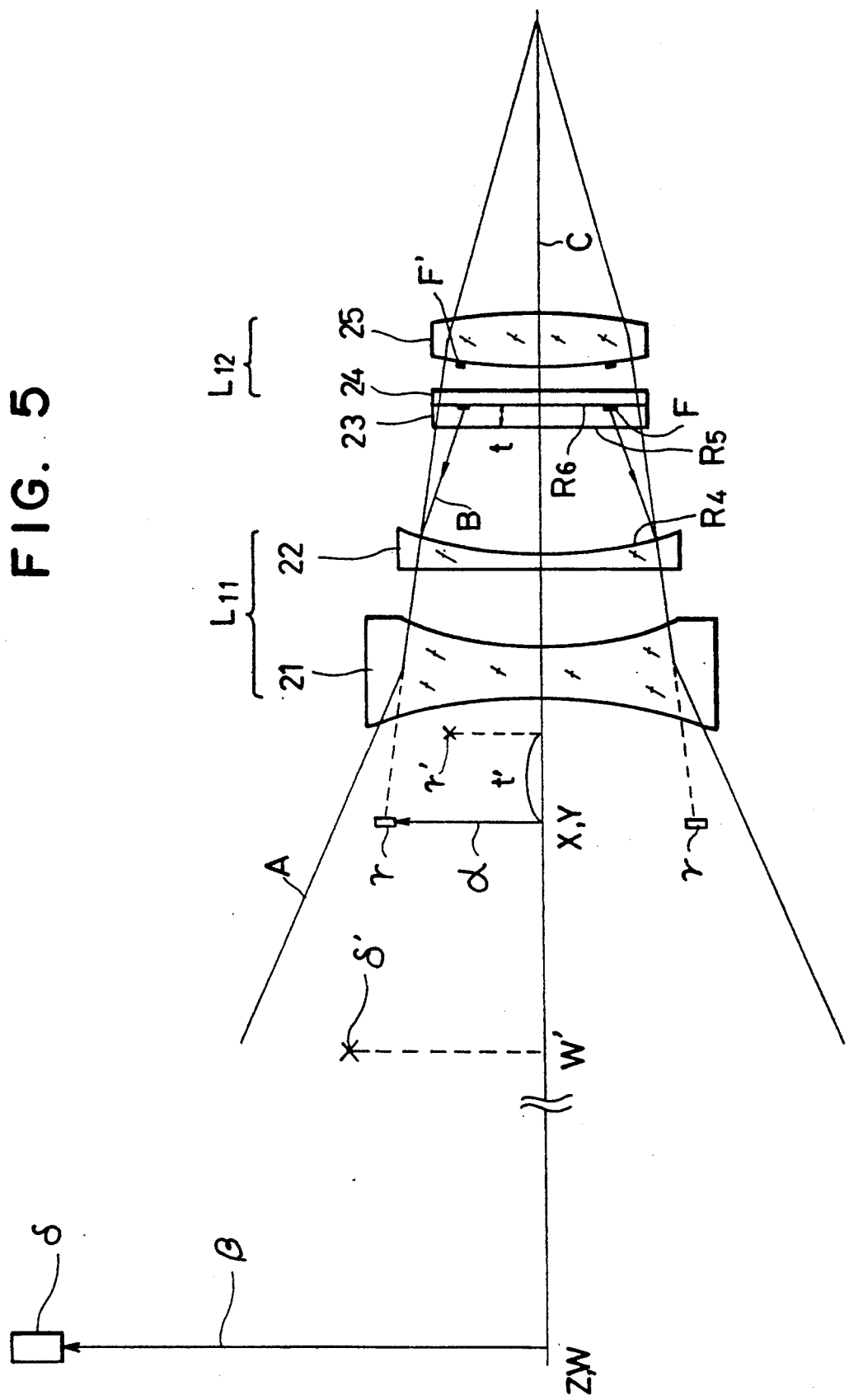
Figure 4:
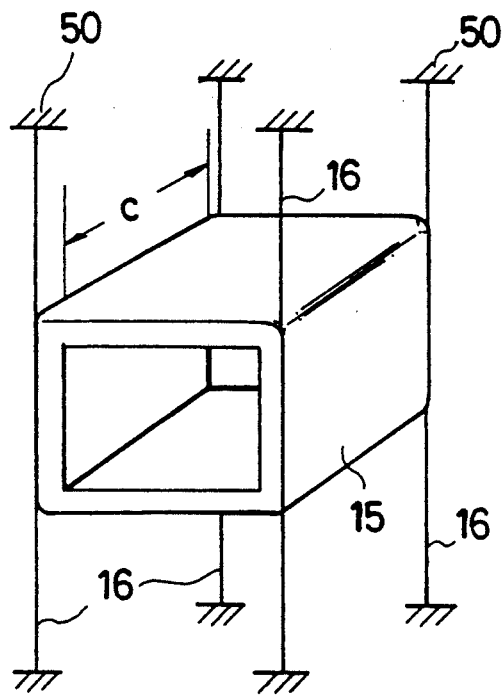
Figure 6:
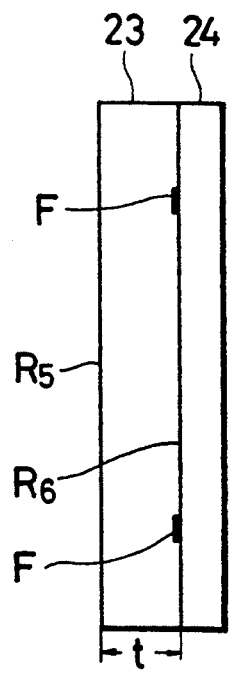

FIGS. 3A, 3B, and 3C are an elevational view, a plan view, and a side view showing the viewfinder according to the first embodiment of the present invention, respectively;

FIG. 4 is a partial perspective view showing an indicating frame of the viewfinder, according to a second embodiment of the present invention;

FIG. 5 shows the optical construction of a viewfinder according to a third embodiment of the present invention; and FIG. 6 is an enlarged side view of a principal component of the viewfinder shown in FIG. 5.

DESCRIPTION OF THE EMBODIMENTS

Figure 1:
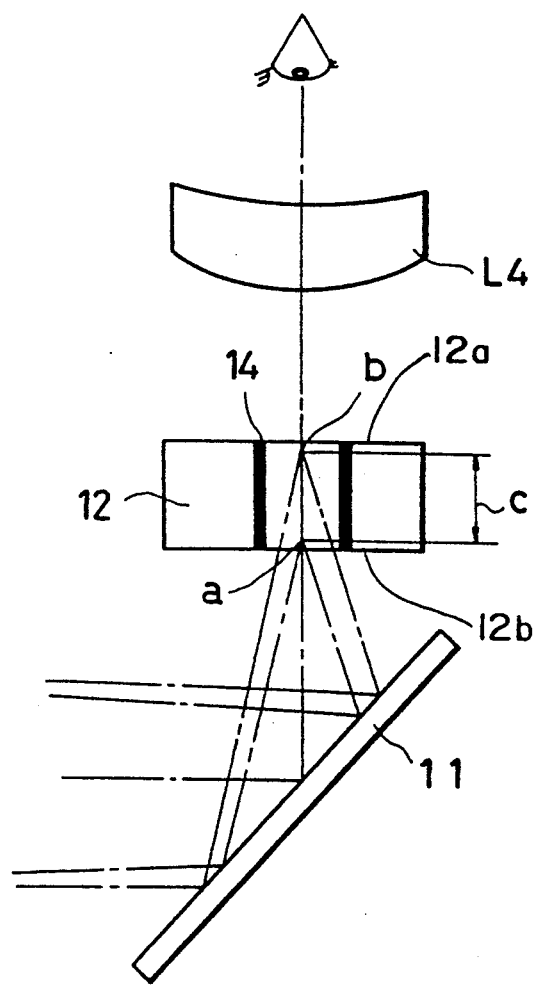
FIG. 1 shows the optical construction of a principal portion of the viewfinder according to a first embodiment of the present invention.
Figure 2:
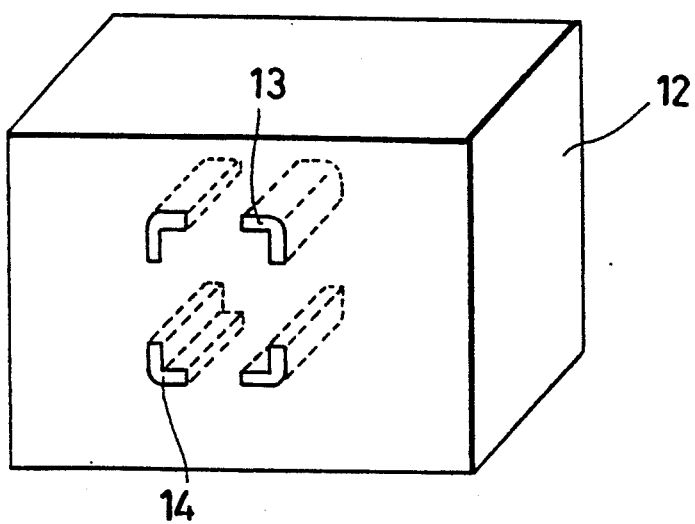
FIG. 2 is a perspective view, showing only the finder screen shown in FIG. 1.

FIG. 1 through FIG. 3 show a first embodiment of the invention, in which the present invention is adapted for use in a real image type viewfinder.

FIGS. 3A, 3B and 3C show the optical construction of the viewfinder according to this first embodiment of the present invention. In these figures, varying power lenses L1, L2, which are movable, and fixed lens L3, are disposed along the optical axis 01 of the optical system of the viewfinder, which comprises the objective optical system. A light beam from an object to be observed is refracted through the objective lens system and is reflected by mirror 11 to form the image (i.e., the real image) of said object inside the finder screen (i.e., indicating frame plate) 12. The image formed inside the finder screen 12 is observed through the eyepiece lens L4 disposed along the optical axis 02, vertically and horizontally inverted by the Porro prism P.

The imaging position of the real image of the object formed by the objective lens system L1, L2 and L3 axially varies according to the object distance.

In this first embodiment of the present invention, the thickness (d) of the finder screen 12 is arranged to be greater than the width of the image forming range c, and a focusing frame (i.e., indicating frame) is provided for said finder screen 12, and extends over the complete range between the incident surface 12a and the emergent or emission surface 12b of the screen 12, as viewed along the axial direction. A principal portion of the viewfinder according to this embodiment is particularly shown in FIG. 1 and FIG. 2, which are drawn emitting Porro prism P. In FIG. 1, if the optical axial imaging position of the image which is formed by the objective lens, and which is based on the object at infinity, is referenced by (a), and similarly, at the shortest distance, is referenced by (b), the optical axial positions of the incident surface and the emission surface of the finder screen 12 should be disposed outside of a and b. Therefore, the thickness (d) of the finder screen 12 is arranged to be more than the distance (c) between positions (a)

and (b), i.e., the screen surfaces will be outside of the image forming range.

This finder screen 12 is provided with a plurality of through holes 13, which are together used as an indicating the frame (i.e., a focusing frame in this embodiment) extending over the complete range of the screen thickness along the optical axial direction, said through holes 13 each being capable of being filled with material 14 comprising, e.g., a transparent material that is diffusible or colored, or an opaque material. This focusing frame material may be omitted, i.e., each hole 13 can be left empty. Further, it is preferable that the surface of the through holes 13 (i.e., their inside surfaces) or the focusing frame material 14 be formed as a diffusing surface.

While a plurality of holes 13 have been illustrated, it may be possible to achieve the advantageous results of the present invention using only two (larger) holes, or even one continuous (e.g., in this case generally rectangular) hole 13.

In a viewfinder constructed as described above, therefore, and within the imaging range of an objective image, wherever the image of the observed object is formed by the objective lens, the focusing frame 14 necessarily exists at the same optical axial distance as the image exists.

Consequently, whatever the object and distance are which an observer observes, the observer need only focus his or her eye on the image which is formed by the objective lens so as to clearly observe the focusing frame 14 at the same time. Thus, the observer need not alternately move and adjust the focus of the observer's eye for the object image and the indicating frame, whereby the observer's eye will not be fatigued.

Even if foreign matter sticks to the surface of the finder screen 12, as long as the observer observes the part of the focusing frame (i.e., the indicating frame) which exists inside of the finder screen, the foreign matter is never clearly seen by the observer. Namely, because the optical axial positions of the part of the focusing frame which is observed, and that of foreign matter sticking to the surface of the finder screen, are different from each other, and because the optical axial positions of the virtual images of the frame and the foreign matter which are formed by the eyepiece lens and which are observed through the eyepiece lens are different from each other, the image of the foreign matter is not imaged in the observer's eye, which is focused on an inside part of the focusing frame (i.e., on an indicating frame).

Additionally, even if foreign matter sticks to the surface of the finder screen 12, as long as the observer observes the object image, the foreign matter is never clearly seen by the observer. Namely, because the positions of the incident surface and the emission surface to which foreign matter may stick are out of the imaging range of an objective image formed by the object lens, and because the optical axial position of the image of the observed object formed by the objective lens and the position of the foreign matter sticking to the surface of the finder screen are different from each other, and, therefore, the positions of the virtual images of the frame and the foreign matter which are formed by the eyepiece lens, and which are observed through the eyepiece lens, are different from each other, the image of the foreign matter is not imaged in the eye of the observer, which eye is focused on the objective image of the observed object.

The effect or result of never clearly seeing foreign matter can be enhanced by increasing the degree of thickness of the finder screen 12. The degree of screen thickness can be preferably determined, e.g., based upon consideration of the lens effect of the finder screen 12, avoidance of interference with other optical components, and so on.

FIG. 4 shows a second embodiment of the present invention. In this embodiment the focusing frame (i.e., indicating frame) 15 comprises only a single hollow member. The thickness (d) of the focusing frame is arranged to be greater than the imaging range (c) of an objective image formed by the objective lens. This focusing frame 15 may be suspended (i.e., "floated") in air by suspending lines 16 at locations on the frame which are preferably out of the image forming range c. These lines can be connected, e.g., to suitable surfaces 50 of a viewfinder casing or housing, as schematically represented in FIG. 4.

Accordingly to this embodiment, it is apparent that the advantageous effect of the first embodiment can again be realized, because all spots in the field of view of the viewfinder can be perfectly eliminated, because no foreign matter can stick to a plane, perpendicular to the optical axis which is located at the same optical axial position as is the end surface of the focusing frame In other words, the optical axial positions are different.

FIG. 5 and FIG. 6 show a third embodiment of the present invention, in which the present invention is adapted for use with an inverted Galilean type albada finder.

FIG. 5 shows the overall optical construction of the viewfinder according to the third embodiment of the present invention.

Such type of viewfinder is generally constructed of a divergent objective lens group L11 and a convergent eyepiece lens group L12. The objective lens group L11 comprises a first negative lens 21 and a second negative lens 22 in this embodiment.

Between the objective lens group L11 and the eyepiece lens group L12, a bright frame plate (i.e., the indicating frame plate) 24 is provided, which is a main feature of this embodiment. This bright frame plate 24 is made of a planeparallel plate comprising transparent material. On the surface R6 of the bright frame plate, which is adjacent to the objective lens, the bright frame F is formed by vapor deposition of the reflecting material The surface formed with the bright frame F thereon is bonded with the cover plate 23, which comprises a plane-parallel plate of transparent material, similar to the bright frame plate 23.

The surface R4 of the second negative lens 22, which is adjacent to the eyepiece, is formed as a half-mirror or a total reflection mirror which has a transparent portion in its center, thereby allowing light beam A, travelling from the areas being observed by the viewfinder, to pass through. The half-mirror or mirror functions as a reflecting surface which reflects the light beam B travelling from the bright frame F so as to make it incident upon the eyepiece lens group L12 (hereinafter referred to as the Albada reflecting surface)

The bright frame plate 24 and the cover plate 23 could be arranged so that the bright frame plate 24 would be located at lens L11 side, and so that the cover plate 23 would be located at lens L12 side, with the bright frame F formed on the surface of the bright frame plate 24 being adjacent to the eyepiece, contrary to the embodiment of FIG. 5. The present invention, in short, can be effected with the bright frame F being disposed inside of the indicating frame plate, comprising bright frame 24 and cover plate 23, as viewed along thickness of plates 23 and 24. The bright frame F could be formed by some means other than by vapor deposition. For example, it could be formed by sandwiching a separate reflecting material, shaped into the shape of the bright frame, between the bright frame plate 24 and the cover plate 23.

In this embodiment, as described above, the objective lens group L11 includes two negative lenses 21 and 22, which are designed not only to correct various aberrations, but also to make it easy to enlarge the degree of the radius of curvature of surface R4 of the second negative lens 22, adjacent to the eyepiece, which determines the position of the virtual image of the bright frame F formed by reflection on the reflecting surface R4.

Thus, the light beam A, travelling from the observed object, passes through the objective lens group L11 once and forms an image $\alpha$ of the object at the optical axial position X, because the objective lens group L11 is a negative lens. If the optical axial position X is located on the image side of the objective side principal focus of the eyepiece lens group L12, the virtual image B of the image $\alpha$, which is magnified by the eyepiece lens group L12, is further formed at the optical axial position Z in FIG. 5, through the eyepiece lens group L12. An observer observes this virtual image $\beta$ through the eyepiece lens group L12. Generally, the reflective power of each of these lenses is determined so that the visibility of the optical axial position Z is "−1" diopter; in other words, the optical axial position Z is located at a position which is spaced by one (1) meter away from an eye of an observer. The optical axial position Z is, however, only an imaging position of the virtual image formed by the eyepiece lens group L12 corresponding to the object at the reference objective position, so that the imaging position of the virtual image of the object which is formed by the eyepiece lens group L12 varies within the imaging range according to the position of the actual object being observed, as described above.

On the other hand, the light beam B travelling from the bright frame F, which is illuminated by a light beam parallel to the optical axis C, is reflected by the Albada reflecting surface R4 of lens 22 so as to be made incident upon eyepiece lens group L12. In this embodiment, the Albada reflecting surface R4 is shaped as a concave mirror, so that the virtual image $\gamma$ of the bright frame F is formed by the reflection on the Albada reflecting surface R4 at the optical axial position Y, which is determined by the following equation, as is well known:

$$y = \frac{(f1)^2}{\Delta f1} \quad (1)$$

where f1 is the focal distance of the Albada reflecting surface R4, $\Delta$ f1 is the distance between the principal focal point of the Albada reflecting surface R4 and the bright frame F, and y is the distance between the principal focal point of the Albada reflecting surface R4 and the optical axial position Y. This condition is generally set in order that the optical axial position X may correspond to the optical axial position Y.

This virtual image $\gamma$ of the bright frame F further forms a virtual image $\delta$ thereof, as a result of the function of the eyepiece lens group L12. An observer observes this virtual image $\delta$ through the eyepiece lens group L12. The diopter D, which represents the visibility of imaging position W of image $\delta$, is determined by the following equation, based upon the optical axial position Y and the focal distance f2 of the eyepiece lens L12, as is well known:

$$D = \frac{\Delta f2}{(f2)^2} \times 1000 \quad (2)$$

where $\Delta$f2 is the distance between the optical axial position Y and the object-side principal focus of the eyepiece lenses L12, which becomes a negative value when Y is on the eyepiece lens side of the object-side principal focus. Accordingly, if $\Delta$ f is a negative value, the virtual image $\delta$ of the image $\gamma$ of the bright frame F is formed at the optical axial position W in FIG. 5, while magnified by the eyepiece lens L12.

This equation is generally set in order that the optical axial position W may be the position having a diopter value of "−1" diopters, corresponding to that of image $\beta$.

No foreign matter can stick to the surface R6 on which the bright frame is formed, which surface is located at the same optical axial position as the bright frame F, because surface R6 is bonded to cover plate 23, so that any image of foreign matter having visibility which is the same as the visibility of the image $\gamma$ of the frame F cannot be seen in the field of view of the viewfinder.

On the other hand, while it is indeed possible that minute foreign matter might stick to the outer surface R5 of cover plate 23, which is exposed to the atmosphere, any such foreign matter sticking to the plate can never be seen with the same visibility as that of the bright frame F, as follows.

If the degree of thickness of the cover plate 23 is referred to as (t), the distance (t') between the optical axial position Y and the optical axial position of the virtual image $\gamma'$ of foreign matter sticking to the surface R5, which is formed by the reflection on the Albada reflecting surface R4, is derived from equation (1) noted above, as the following equation:

$$t' = \frac{(f1)^2}{\Delta f1} - \frac{(f1)^2}{\Delta f1 + t} \quad (3)$$

As a result, the visibility W' of the imagining position of the image $\delta'$ which is the image of the virtual image $\gamma'$ magnified by the eyepiece lens group L12, is derived from equations (2) and (3) as the following equation:

$$D' = \frac{\Delta f2 - t'}{(f2)^2} \times 1000 \quad (4)$$

Assuming that f2=20 mm, $\Delta$ f2= −0.4 mm and t'−1.2 mm, each of the diopter valves is calculated as D= −1, D'= −4, each on equations (2) and (4). Thus, the position of the image $\delta$ of the bright frame F and the image $\gamma'$ of foreign matter sticking to the surface R5 formed by eyepiece lens group L12, respectively, are different each other along the optical axis. Therefore, if an observer focuses his eye on the image $\delta$ of the bright frame F, which is a field frame, the image $\delta'$ of the foreign matter is not imaged on the retina of the eye of an observer, and such foreign matter is thus recognized by the observer only as a defocused image, at most. Consequently, foreign matter is not conspicuously seen in the field of view of the viewfinder.

Additionally, if the various conditions are arranged in an order such that the optical axial position W' of the image δ', whose visibility is expressed as diopter D', may become nearer to the observing eye than the optical axial position of an image whose visibility is −4 diopters, the image δ' of the foreign matter can not easily be seen through the eyepiece lens group L12, because the near point for accommodating an emmetropic eye is at a distance of about 25 centimeters. However, even if the optical axial position W' of the image δ' shown by the diopter D' should be further from the observing eye than the optical axial position of the image whose visibility is −4 diopters, the object of the present invention can be achieved as long as the optical axial position W' of the image δ' of the foreign matter differs from that of the image δ of the bright frame F. Because the visibility of the images δ' and δ differ from each other, the foreign matter is not conspicuously seen in the field of the viewfinder, as described above.

The present invention may be effected not only when the Albada reflecting surface R4 is a concave mirror, but also when the surface R4 is a plane mirror. In this latter case, although the virtual images γ and γ' are not formed by reflection on the surface R4, equations (2) and (4) may nonetheless be used, by regarding the optical axial position Y as the conjugate position of the optical axial position of the bright frame F through the Albada reflecting surface R4, and by considering t=t'.

Although the present invention is adapted for use with an inverted Galilean type Albada finder through which the image β of an object and the image δ of a field frame are observed with substantially the same visibility as in the above-described embodiment, the present invention is not limited to use with such a finder, but may also be adapted for use, e.g., with a viewfinder through which images β and δ are observed with different respective visibilities, as long as the image δ' of minute foreign matter and the image δ of the field frame cannot be observed with the same visibility. Further, the present invention may be adapted for use with an inverted Galilean type finder having an illuminating window type bright frame in which the bright frame comprises a transparent slit provided in an illuminated opaque plate. In this case, both sides of the illuminated opaque plate may be bonded to separate cover plates, such as plate 23.

Additionally, although the present invention is adapted for use with an inverted Galilean type Albada finder having a bright frame F formed on a surface R6 of the bright frame 24, as in the above-described embodiment, it may also be adapted for use with an inverted Galilean type Albada finder where the bright frame F' is directly formed, e.g., by vapor deposition, on the surface of the eyepiece lens, i.e., positive lens 25 which is adjacent to the object In this case, the cover plate 25 may be shaped as a curved-parallel plate or a lens comprising a part of eyepiece lens group L12.

Additionally, the finder screen 12 described in the first embodiment, or the focusing frame described in the second embodiment, may be employed instead of the bright frame plate 24 or the cover plate 23.

It is noted that the length of the optical axis of the optical system can be spread as a result of the refractive index, e.g., of a plane-parallel plate, such as cover plate 23, which lies in the optical system; therefore, it is preferable that such an effect be corrected before using the system, e.g., by appropriately changing the optical characteristics of one or more optical elements in the system.

While the invention has been described by reference to specific embodiments chosen for purposes of illustration, it should be apparent that numerous modifications could be made thereto by those skilled in the art without departing from the basic concept and scope of the present invention.

What we claim is:

1. A viewfinder having an objective lens, an eyepiece lens, an image of an indication frame and an image of an object being observed through said eyepiece lens as virtual images, said viewfinder further comprising an optical component having an incident surface and an emission surface, wherein at least a portion of said indicating frame is located between said incident and emission surfaces, said optical element having a thickness such that any foreign matter adhered on said incident surface or on said emission surface is prevented from being visible at the same time that said indication frame is visible through said eyepiece lens.

2. A viewfinder as claimed in claim 1, wherein said indicating frame is located at only one axial position of the viewfinder.

3. A viewfinder as claimed in claim 2, wherein said optical component comprises two optical sections which are bonded to each other along a common plane, said indicating frame being positioned along said common plane.

4. A viewfinder as claimed in claim 1, wherein said indicating frame extends over an distance between said incident and emission surfaces.

5. A viewfinder as claimed in claim 4, wherein said indicating frame comprises at least one hole formed in said optical component 6. A viewfinder as claimed in claim 5, further comprising indicating frame material filling at least a portion of said at least one hole.

7. A viewfinder as claimed in claim 5, wherein said frame comprises a plurality of holes in said optical component.

8. A viewfinder as claimed in claim 1, wherein said optical component is a planar plate, said incident surface and said emission surface being parallel to each other.

9. A viewfinder as claimed in claim 8, wherein said frame extends so as to include said incident and emission surfaces.

10. A viewfinder as claimed in claim 9, wherein said objective lens has positive refractive power and comprises means for forming a real image of an object.

11. A viewfinder as claimed in claim 10, wherein the indicating frame is located at an image forming position at which the real image of the object is formed.

12. A viewfinder as claimed in claim 1, wherein said objective lens has negative refractive power and comprises means for forming a virtual image of the object.

13. A viewfinder as claimed in claim 12, wherein said objective lens includes a surface adjacent to said eyepiece lens, said objective lens surface comprising a reflective surface.

14. A viewfinder as claimed in claim 13, wherein said indicating frame is located at a position at which the image of an object which is reflected by said reflective surface is formed.

15. A viewfinder as claimed in claim 1, wherein said indicating frame is a bright frame.

16. A viewfinder as claimed in claim 1, wherein said indicating frame is a focusing frame comprising means for representing an area for measuring a distance of an object with an object distance measuring device.

17. A viewfinder as claimed in claim 1, wherein said indicating frame is a field frame comprising means for representing an area to be photographed by a photographing optical system.

18. A viewfinder as claimed in claim 1, wherein said objective lens has positive refractive power and comprises means for forming a real image of said object, said indicating frame being located within a image forming range of the real image, a position of the real image of said object varying, dependent upon a distance of said object from the objective.

19. A viewfinder having an objective lens, an eyepiece lens, and an indicating frame which is observed through said eyepiece lens together with an image of an object formed by said objective lens, wherein said indicating frame is suspended in said viewfinder, and means for suspending said indicating frame in said viewfinder, said suspending means being positioned outside of an image forming range at which an image of an object is formed, in an optical axis direction of said viewfinder, said indicating frame has a thickness which is at least as large as an image forming range in which an image of the object can be formed by said objective lens.

20. A viewfinder as claimed in claim 19, wherein said indicating frame is suspended by hanging lines which are located outside of the image forming range.

21. A viewfinder as claimed in claim 19, wherein said indicating frame comprises a hollow tubular member.

22. A viewfinder as claimed in claim 21, wherein said indicating frame extends in an optical axis direction.

23. A viewfinder as claimed in claim 22, wherein said objective lens has a positive refractive power and comprises means for forming a real image of the object.

24. A viewfinder having an objective lens, an eyepiece lens, and an indicating frame which is observed through said eyepiece lens together with an image of an object formed by said objective lens, wherein said indicating frame is suspended in said viewfinder, and means for suspending said indicating frame in said viewfinder, said suspending means being positioned outside of an image forming range at which an image of an object is formed, in an optical axis direction of said viewfinder, said indicating frame comprising a hollow member that extends in an optical axis direction, said objective lens has a positive refractive power and comprises means for forming a real image of the object, said indicating frame is located at an image forming position at which the real image of an object is formed, said indicating frame has a thickness which is at least as large as an image forming range in which the real image of the object can be formed by said object lens.

25. A viewfinder as claimed in claim 24, wherein said indicating frame is suspended by hanging lines which are located outside of the image forming range.

26. A view finder having an objective lens, an eyepiece lens, an indicating plate having an indicating frame, an image of said indicating frame and an image of an object being observed through said eyepiece lens as virtual images, said indicating plate comprising an incident surface and an emission surface, said indicating plate having a thickness such that any foreign matter adhered on said incident surface or said emission surface is prevented from being visible at the same time that said indicating frame is visible through said eyepiece lens.

27. A viewfinder as claimed in claim 26, wherein said objective lens has a positive refractive power and comprises means for forming a real image of the object.

28. A viewfinder as claimed in claim 27, wherein said indicating plate is disposed at an imaging position of the real image of the object formed by said objective lens.

29. A viewfinder as claimed in claim 26, wherein said indicating plate is a finder screen.

30. A real image type viewfinder having an objective optical system including a focusing screen and which forms an image of an object on said focusing screen, and an eyepiece optical system for observing said image, wherein said focusing screen has a thickness greater than or equal to an image forming range in which the object image can be formed by said objective optical system, said object image being located at a position which depends upon a distance of the object from said objective optical system.

31. A viewfinder as claimed in claim 30, wherein said thickness is greater than said image forming range.

32. A viewfinder as claimed in claim 30, wherein said object image is positioned within said image forming range.

33. A viewfinder having an objective lens, an eyepiece lens, an indicating frame adapted to be observed through said eyepiece lens, and means for preventing foreign matter within said viewfinder from being clearly visible at a same time that said indicating frame is visible through said eyepiece lens.

34. A viewfinder having an objective optical system for forming an image of an object, an eyepiece optical system, and means for separating any foreign matter within said viewfinder from said image, said separating means comprising an optical element having a thickness such that thickness defining ends of said optical element are out of an image forming range.

35. A viewfinder as claimed in claim 34 wherein said object image is located within a predetermined object image forming range, said separating means further comprising means for separating said object image forming range from said foreign matter.

36. A viewfinder having an objective lens, an eyepiece lens, an indicating frame adapted to be observed through said eyepiece lens, and means for separating any foreign matter located within said viewfinder from said indicating frame, said separating means comprising an optical element having a thickness such that any foreign matter adhered on a thickness defining said end of said optical element is prevented from being clearly visible at the same time that said indicating frame is visible through said eyepiece lens.

* * * * *

UNITED STATES PATENT AND TRADEMARK OFFICE
CERTIFICATE OF CORRECTION

PATENT NO. : 5,218,393

DATED : June 8, 1993

INVENTOR(S) : SUSAO NAKAMURA et al.

It is certified that error appears in the above-indentified patent and that said Letters Patent is hereby corrected as shown below:

On the cover, section [30] under "Foreign Application Priority Data", change "2-38140" to ---2-39140---.
On the cover, section [56], under "U.S. Patent Documents", insert Patent No. --2,807,981--, issued --10/57--, to Barnes--.
On the cover, section [56], under "Foreign Patent Documents", insert the following patents:

| Patent Number | Date | Country |
|---|---|---|
| 3624821 | 2/88 | Germany |
| 2154332 | 9/85 | United Kingdom |
| 1039357 | 9/58 | Germany |
| 697040 | 10/40 | Germany |
| 42-7890 | 4/42 | Japan-- |

At column 10, line 32 of the printed patent, change "an" to --a entire--.

Signed and Sealed this

Twenty-third Day of May, 1995

*Attest:*

BRUCE LEHMAN

*Attesting Officer*   *Commissioner of Patents and Trademarks*